3,091,648
VINYLIDINE FLUORIDE DERIVED COTELOMER OILS

Murray Hauptschein, Glenside, and Milton Braid, Philadelphia, Pa., assignors to Pennsalt Chemicals Corporation, Philadelphia, Pa., a corporation of Pennsylvania
No Drawing. Filed Nov. 26, 1958, Ser. No. 776,432
5 Claims. (Cl. 260—653.1)

This invention relates to fluorinated organic compounds and more particularly, is concerned with low molecular weight polymers, particularly those which are liquid at room temperature, prepared by co-telomerizing vinylidene fluoride with other halogenated olefins.

Liquid low polymers (usually referred to as telomers) of haloolefins, particularly those containing a high proportion of fluorine, are known to be non-flammable and to have superior chemical and thermal stability in contrast to hydrocarbon oils. Because of their non-flammability and superior stability, these halocarbon oils may be used, for example as lubricants, hydraulic fluids, damping fluids etc. in many applications involving exposure to relatively high temperatures and/or exposure to chemical attack which would cause hydrocarbon oils to degrade rapidly. Although having superior chemical and thermal stability, the halogenated telomer oils which have thus far been suggested, and particularly those containing high proportions of fluorine, have suffered from the disadvantage of undergoing marked changes in viscosity with change in temperature. This is true for example of commercially available telomer oils prepared from the olefin chlorotrifluoroethylene which undergo considerably larger changes in viscosity with temperature than hydrocarbon oils of corresponding viscosity. Such a high rate of viscosity change with temperature is a distinct disadvantage in many cases. For example, an excessive decrease in viscosity will seriously diminish the lubricant properties of an oil or its usefulness as a hydraulic fluid.

There is accordingly, a need for liquids of an oily nature suitable as lubricants, hydraulic fluids and the like, which are non-flammable, have relatively high chemical and thermal stability, and which at the same time have desirable viscosity-temperature properties, that is to say, which undergo relatively small changes in viscosity with change in temperature.

In accordance with the present invention, it has been found that open-chain cotelomers prepared by cotelomerizing vinylident fluoride with another olefin as hereinafter defined in which the cotelomer chain contains at least four and not more than about forty olefin units consisting predominately of vinylidene fluoride ($CH_2CF_2$) units and a minor proportion of units derived from the other olefin, possess this desirable combination of properties. In the course of investigations leading to the present invention, it was found that homotelomers of vinylidene fluoride have a strong tendency to form solids at relatively low molecular weights. Homotelomers of vinylidene fluoride of the formula, for example $$CF_3(CH_2CF_2)_nCl$$

are light, relatively volatile liquids when the value of $n$ is 1 and 2, but at higher values of $n$ are solids melting above room temperature. This tendency to undergo an abrupt transition from light mobile liquids to solids rather than forming a series of liquids of gradually increasing viscosity and melting point can be overcome by providing at least one end of the telomer chain with a sterically bulky end group having three or more carbon atoms as described in the copending application Serial No. 773,551 filed November 13, 1958, and now U.S. Patent No. 2,975,220, of Murray Hauptschein et al. for "Fluorinated Organic Compounds." Although relatively heavy oils suitable as lubricants and the like having good viscosity-temperature properties can be obtained by this technique, it is necessary to use telogens having 3 or more carbon atoms which are relatively expensive to prepare.

By cotelomerizing vinylidene fluoride with minor amounts of other haloolefins, it has been found that the tendency of the vinylidene fluoride chain to produce solids at relatively low molecular weights can be overcome without introducing bulky end groups into the telomer while at the same time retaining to a high degree the desirable viscosity-temperature properties imparted by the repeating vinylidene fluoride ($CH_2CF_2$) units in the telomer chain. By cotelomerizing vinylidene fluoride for example with controlled amounts of chlorotrifluoroethylene, a series of liquid cotelomers are formed of gradually increasing viscosity providing medium to heavy bodied non-volatile oils and greases of good lubricant properties. By properly controlling the proportion of chlorotrifluoroethylene units to vinylidene fluoride units in the telomer chain, as will be explained more in detail hereafter, it has been found possible to obtain the desired heavy bodied oils of useful lubricant viscosity without at the same time imparting the relatively poor viscosity-temperature properties which are characteristic of teleomer oils prepared from chlorotrifluorethylene.

Olefins suitable for cotelomerizing with vinylidene fluoride to produce the cotelomers of the invention are halogenated monoolefins having from 2 to 10 and preferably from 2 to 4 carbon atoms, containing only elements selected from the class consisting of carbon, hydrogen and halogen and in which the molar ratio of halogen:hydrogen is at least 1:1. The halogen in the other olefin is preferably fluorine and/or chlorine. Particularly preferred are perfluorochloro, and perfluorochlorohydro monoolefins having from 2 to 4 carbon atoms and perfluoro and perfluorohydro monoolefins having 3 to 4 carbon atoms, especially perfluoropropene and perfluorobutene. From the standpoint of low cost, ease of reaction, and the desirable properties of the cotelomers produced, perfluorochloro and perfluorochlorohydro ethylenes are an especially valuable class, particularly the following: $CF_2=CFCl$, $CH_2=CFCl$, $CF_2=CCl_2$, and $CF_2=CHCl$.

Example of other olefins that may be employed include particularly $CH_2=CFCF_3$, $CH_2=CClCF_3$, $CH_2=CFCF_2Cl$,
$CH_2=Cl_2$, as well as $CH_2=C(CF_3)_2$, $CF_2=C(CF_3)_2$, $CH_2=CHCF_3$, and

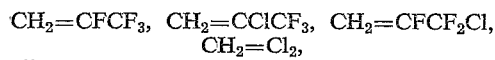

Mixtures of two or more olefins of the above type may also be cotelomerized with vinylidene fluoride if desired, such as a mixture of $CF_2=CFCl$ and $CH_2=CFCl$. In such cases the cotelomer chain contains three or more different types of olefin units. It is to be understood that the term "other olefin" as used herein is intended to include such mixtures.

In order to obtain cotelomers of the desired properties, namely cotelomers that provide relatively heavy oils which are liquids at or close to room temperature, which have desirable viscosity-temperature properties and which are substantially non-flammable and have good chemical and thermal stability, it is necessary to introduce the other olefin into the cotelomer chain in minor, controlled amounts. Generally, the other olefin should comprise from about 5% to 25% of the cotelomer chain; i.e., the molar ratio of vinylidene fluoride ($CH_2CF_2$) units in the cotelomer chain to units derived from the other olefin should be in the range of from 95:5 to 75:25. Preferably, this molar ratio is in the range of from 90:10 to 80:20. Generally more than 25% of the other olefin in the cotelomer chain will detrimentally affect the viscosity-temperature characteristics of the cotelomer, while less than 5% will fail to provide the desired oily cotelomers that are liquid at or close to room temperature. The optimum balance between these factors within the limits specified can be determined in any particular case in light of the foregoing and of the examples which follow.

While the invention does not depend upon any particular theory relating the structure of the cotelomers of the invention to the desirable properties which they display, it is believed that the desirable viscosity-temperature properties of these cotelomers is related to the viscometric properties of the vinylidene fluoride ($CH_2CF_2$) units in the chain in which the alternating —$CH_2$— groups allow freer rotation than other configurations. It is also believed the repeating ($CH_2CF_2$) units are responsible for the fact that telomers of this type tend to be solids at relatively low molecular weights. As pointed out, homotelomers of vinylidene fluoride having small end groups such as $CF_3$— or $C_2F_5$— end groups do not form liquid oils of lubricant viscosity, but undergo sharp transition from light liquids to solids of considerable crystallinity. This strong tendency to form solids is believed due to the fact that the telomer chains tend to orient with one another in a close packed arrangement. It is believed that by introducing minor amounts of other olefin units into the cotelomer chain, the orientation of the telomer chains in a crystalline pattern is sterically hindered, thus preventing a rapid transition from light liquids to solids. This explanation, based on steric phenomena, is borne out by the fact that similar results may be obtained in the case of homotelomers by employing sterically bulky end groups on the cotelomer chain as described in copending application Serial No. 773,551, referred to above. While the desired oils of useful viscosity may be obtained in accordance with invention by cotelomerization alone, i.e. without using sterically bulky end groups, if desired both techniques may be employed simultaneously each helping to produce the desired result. Thus, cotelomers of the invention having sterically bulky end groups, for example branched-chain perhaloalkyl groups having three or more carbon atoms, tend to exist as liquids or low-melting solids over an even wider range of molecular weights than corresponding cotelomers having relatively small end groups.

According to preferred procedures the telomers of the invention are prepared by reacting a mixture of vinylidene fluoride and another olefin as above defined with a telogen of the general formula RI where I is iodine and where R is a halogenated radical having from 1 to about 10 carbon atoms and preferably from 1 to 4 carbon atoms and is selected from the class of radicals having the formulae $ACX_2$—, $ABCX$— and $ACX_2CHX$— where X may be fluorine or chlorine and where A may be halogen, or a halogenated aryl radical, alkyl radical or cycloalkyl radical containing only elements from the class consisting of carbon, halogen and hydrogen and in which the molar ratio of halogen:hydrogen is at least 1:1, and where B may be a halogenated aryl, alkyl or cycloalkyl radical containing only elements selected from the class consisting of carbon, halogen and hydrogen and in which the molar ratio of halogen:hydrogen is at least 1:1. When A or B is aryl it is preferably phenyl. When X occurs twice or more in the same compound it may be the same or different.

Preferably A is fluorine, chlorine or a perfluoroalkyl, perfluorochloroalkyl, perfluorohydroalkyl, or perfluorochlorohydroalkyl radical. Preferably B is a perfluoroalkyl, a perfluorochloroalkyl or a perfluorochlorohydroalkyl radical. As used herein, the term perfluoro means containing only fluorine and carbon. Perfluorochloro means containing only fluorine, chlorine and carbon. Perfluorohydro means containing only fluorine, hydrogen and carbon in which the molar ratio of fluorine:hydrogen is at least 1:1. Perfluorochlorohydro means containing only fluorine, chlorine, hydrogen and carbon in which the molar ratio of fluorine plus chlorine:hydrogen is at least 1:1. Preferred are telogens in which R is a perfluoroalkyl or perfluorochloroalkyl radical, particularly those having from 1 to 4 carbon atoms.

Particularly suitable telogens include $CF_2ClCFClI$, $CFCl_2CF_2I$, $CF_3CFClI$, $CF_2ClCHClI$, $CF_2ClI$, $CF_2HI$, $CF_3I$, $C_2F_5I$, $CF_3CFICF_2Cl$, and $CF_3CFICF_3$.

Other suitable telogens include $CF_3CF_2CF_2I$, $CF_3C(CF_3)ClI$, $CF_2ClC(CF_2Cl)FI$, $CFCl_2C(CF_2Cl)FI$, $C_2F_5CF(CF_3)I$, $C_4F_9C(CF_3)FI$, $(CF_3)_3CI$, $$C_4F_9C(CF_3)FCF_2CF(CF_3)I$$

$CF_3CFICF_2I$, $CF_2ICF_2CF_2I$,

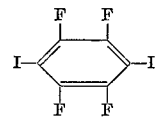

$CF_3C(CF_3)FCF_2C(CF_3)FCF_2C(CF_3)FI$
$CF_2ClC(CF_3)FCF_2C(CF_3)FCF_2C(CF_3)FI$

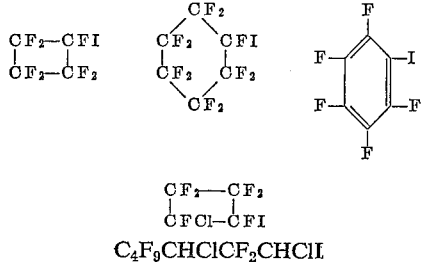

$C_4F_9CHClCF_2CHClI$

The above telogens can be prepared in many cases by the addition of $I_2$, iodine monochloride or iodine monofluoride to the corresponding olefin. For example, the telogens $CF_2ClCFClI$, $CF_2ClCHClI$, and $CF_3CFICF_2Cl$ may be prepared by the addition of iodine monochloride to the olefins $CF_2=CFCl$, $CF_2=CHCl$, and $CF_3CF=CF_2$ respectively. Similarly, the telogens $CF_3CFClI$ and $CF_3CFICF_3$ may be prepared by the reaction of a mixture of $IF_5$ and iodine with the olefins $CF_2=CFCl$ and $CF_3CF=CF_2$ respectively at a temperature of 0° C. in the case of $CF_2=CFCl$ and at 100° C. in the case of $CF_3CF=CF_2$ in the presence of a catalyst consisting of metallic aluminum and aluminum iodide. The addition to other olefins proceeds in a similar fashion. Some of the longer chain telogens such as $C_4F_9C(CF_3)CFI$ or $C_4F_9CF(CF_3)CF_2CF(CF_3)I$ are most conveniently prepared by telomerization reactions such as described in the copending application of Hauptschein et al. Serial No. 701,995 filed December 11, 1957. For example, $C_4F_9CF(CF_3)I$ may be prepared by the reaction of $CF_3CF_2CF_2I$ with $CF_3CF=CF_2$ at 200° C. at about 5000 lbs./in.² gage as described in Example 1 of that application.

Reaction between the mixture of vinylidene fluoride, the other olefin and the telogen is preferably carried out using heat alone, i.e. in the absence of initiators such as ultraviolet light or peroxides, at temperatures ranging from about 120° C. to 350° C. and preferably from about 140° C. to about 250° C. Such initiators, however, may be employed if desired in which case the reaction will generally proceed at lower temperatures. For example, using ultraviolet light irradiation, the reaction may proceed at room temperature.

Using heat alone, the reaction is preferably carried out under super-atmospheric pressures ranging from about 100 lbs./in.$^2$ gage to any practical limit, e.g. 20,000 lbs./in.$^2$ gage. Reaction pressures in the range from 500 to 10,000 lbs./in.$^2$ gage are usually preferable.

Reaction time is whatever is required to give satisfactory conversions and the optimum reaction time will depend on the particular telogen employed and on the temperature. To a certain extent the reaction time influences the chain length of the product obtained. Normally the reaction time is from about ten minutes to about two weeks usually from about one-half hour to about two days.

The proportion of total olefin to telogen is not critical with respect to whether or not the reaction will take place, but does have a significant influence on the chain length of the telomer, higher total olefin:telogen ratios favoring higher molecular weight telomers. The molar ratio of total olefin (i.e. vinylidene fluoride plus the other olefin) to telogen in the reaction mixture should be between about 1:1 to 20:1, and preferably between 2:1 and about 12:1.

The molar ratio of vinylidene fluoride to the other olefin in the reaction mixture determines to a large extent the ratio of vinylidene fluoride units to units derived from the other olefin in the cotelomer product. In general, the higher the molar proportion of vinylidene fluoride, the lower will be the proportion of other olefin units in the product. Seldom, however, is the molar ratio of vinylidene fluoride to the other olefin in the reaction mixture the same as the ratio of olefin units in the product. Higher or lower ratios in the reaction mixture than those desired in the cotelomer product are often necessary. Thus, in the case of olefins that are of the same order of polymerizability, or which are more easily polymerized than vinylidene fluoride (e.g. $CF_2=CFCl$), the molar ratio of vinylidene fluoride to the other olefin should usually be approximately the same as or higher than the molar ratio desired in the cotelomer product. When the other olefin, on the other hand, is difficultly polymerizable (e.g. perfluoropropene), it is usually necessary to employ molar ratios of vinylidene fluoride to the other olefin in the reaction mixtures which are lower than the desired molar ratio in the cotelomer product. For olefins which are readily polymerizable, the desired molar ratio of vinylidene fluoride to the other olefin in the cotelomer can generally be attained by using ratios in reaction mixture in the range of 4:1 to 20:1, while in the case of difficulty polymerizable olefins such as perfluoropropene the desired ratio in the product can generally be obtained by using ratios in the reaction mixture ranging from 1:1 to 10:1.

The cotelomers produced by the procedures described above are open chain compounds which may be represented by the general formula: $R(Z)_m(CH_2CF_2)_nI$ where R and I are as defined above and where $n$ and $m$ are integers of the series 1, 2, 3, 4 etc. and where Z represents a divalent monomer unit derived from the other olefin. Since the condensation of the olefin into the cotelomer chain takes place at the double bond, the units (Z) may be represented as ethylenic divalent radicals, thus:

$$\begin{array}{c} R^1\ R^2 \\ |\ \ | \\ -C-C- \\ |\ \ | \\ R^3\ R^4 \end{array}$$

where $R^1$, $R^2$, $R^3$ and $R^4$ are selected from the class consisting of hydrogen, halogen, and halogenated alkyl, cycloalkyl, aryl, and aralkyl radicals depending upon the particular monomer employed. Thus, the cotelomers of the invention may be represented more specifically by the general formula:

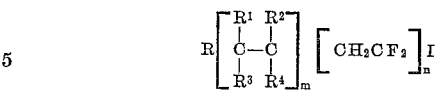

The reaction of a telogen RI with vinylidene fluoride and typical examples of other olefins to produce cotelomers of the above general type is exemplified by the following:

$RI+CH_2=CF_2+CF_2=CFCl \rightarrow$
$\qquad R[CF_2CFCl]_m[CH_2CF_2]_nI$
$RI+CH_2=CF_2+CF_2=CHCl \rightarrow$
$\qquad R[CF_2CHCl]_m[CH_2CF_2]_nI$
$RI+CH_2=CF_2+CH_2=CFCl \rightarrow$
$\qquad R[CH_2CFCl]_m[CH_2CF_2]_nI$
$RI+CH_2=CF_2+CF_2=CCl_2 \rightarrow$
$\qquad R[CF_2CCl_2]_m[CH_2CF_2]_nI$

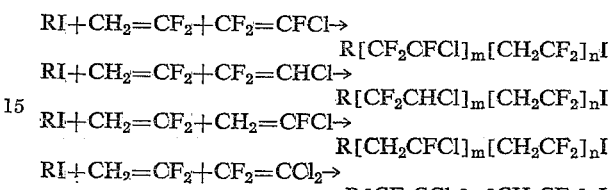

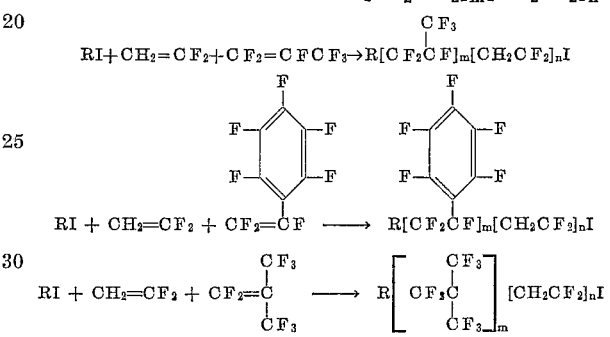

As indicated by the formulae above, the cotelomers of the invention are open chain compounds in which the chain portion consists of a number of olefin units mostly derived from vinylidene fluoride with some units derived from the other olefin linked end-to-end in a straight chain.

The structure indicated above is not intended to imply any more than that the cotelomer has R and I end groups enclosing a cotelomer chain containing vinylidene fluoride ($CH_2CF_2$) units and units derived from the other olefin connected to one another in a straight chain. The olefin units ($CH_2CF_2$) and (Z) are shown as separately grouped merely for the sake of simplicity. Actually, the different olefin units may alternate with one another in random order, both singly and in small groups. It is believed that the second olefin unit (Z) will generally occur singly in the telomer chain rather than in groups (particularly when the second olefin is difficultly polymerizable, (e.g. perfluoropropene) such that the telomer chain consists of small groups of vinylidene fluoride ($CH_2CF_2$) units separated by single units derived from the other olefin. The cotelomer chain may begin or terminate with either olefin unit at random, although it is believed in a number of cases the cotelomer will preferentially terminate with a vinylidene fluoride ($CH_2CF_2$) unit. It is believed this is the case for example when vinylidene fluoride is cotelomerized with $CF_2=CFCl$ in accordance with the procedure described above.

As explained previously, the molar ratio of vinylidene fluoride ($CH_2CF_2$) units in the cotelomer chain to units derived from the other olefin should be within the range of from 95:5 to 75:25 and accordingly, the ratio $n:m$ in the above general formulae should be within that range. In order to obtain cotelomer products which are oils at normal or somewhat above normal temperatures useful as lubricants, hydraulic fluids, damping fluids and the like, the value of $n+m$ in the above formulae should not exceed about 40. The maximum telomer chain length at which oils or low melting solids are obtained will vary depending upon the size and configuration of the other olefinic unit, upon the proportion of such other unit which has been incorporated into the cotelomer chain and likewise upon the size and configuration of the end group R. In general, an increasing proportion of the other olefin or the use of an olefin which is sterically bulky tends to increase the range of chain lengths over which the cotelomers are liquids or low melting solids. Likewise, when the end group R is sterically bulky the same tendency is observed. The value of $n+m$ in the cotelomers of the invention should not be less than four since it is not possible to obtain the rquired $n:m$ ratio in cotelomers of shorter chain length.

Oils of the most useful range of viscosity are generally obtained when the cotelomer contains from 5 to 15 total olefin units, i.e. when the value of $n+m$ in the formulae above is in the range of from 5 to 15.

The telomerization reaction inherently produces a mixture of telomers of varying chain lengths and correspondingly varying molecular weights. The average chain-length and the spread of molecular weights produced by the telomerization reaction can be controlled within limits as discussed above by varying the reaction time, the total olefin:iodide molar ratio and reaction temperature. If desired, individual compounds can be separated from the mixture, e.g. by careful fractional distillation, or the raw mixture of telomers can be separated into fractions of narrower ranges of molecular weight having desired viscosity or other properties. It is intended that the appended claims cover both the individual compounds and mixtures of the individual compounds.

The telomers described above having terminal iodine atoms have some utility in themselves as lubricants, hydraulic fluids and the like, and are also useful for easy conversion into derivatives, e.g. acids, esters, amides, amines etc. by first forming a halosulfate by reaction with chlorosulfonic or fluosulfonic acid and then further reacting the halosulfate as described in copending application Serial No. 735,702, filed May 16, 1958. For use as oils, however, it is generally preferred to replace the terminal iodine atom with chlorine, fluorine or hydrogen in order to produce telomers which are more stable to heat and chemical reagents.

Replacement of the terminal iodine atom by hydrogen may be carried out using lithium aluminum hydride or a conventional catalytic hydrogenation process. See for example Hauptschein, Saggiomo and Stokes, Journal of the American Chemical Society, 78, 680 (1956) for the use of $LiAlH_4$ in replacing iodine by hydrogen in perfluoro iodides. These same procedures may be employed in replacing the terminal iodine with hydrogen in the cotelomers of the invention.

Replacement of the terminal iodine with fluorine may be accomplished by treating the cotelomer iodide with fluorinating agents such as $SbF_3Cl_2$ or a mixture of $SbF_3$ and $SbCl_5$ at normal or slightly elevated temperatures such as from 20° C. to 150° C.

Replacement of the terminal iodine atom with chlorine may be accomplished by treating the cotelomer iodide with elemental chlorine at temperatures ranging from 20° C. to 250° C. with or without ultraviolet light irradiation. In the chlorination of the cotelomer iodide, it has been found that iodine chlorides such as iodine monochloride which are formed as a by-product of the chlorination reaction tend to catalyze the formation of some double bond containing material, probably through loss of HI from cotelomer iodides terminating in a —$CH_2CF_2I$ end group to produce unsaturated cotelomers, probably terminating in a —$CH=CF_2$ group. Since in most cases the cotelomer iodides terminate predominately in —$CH_2CF_2I$ groups it is preferable to conduct the chlorination in such fashion that the iodine chloride by-product is removed from the reaction mixture as it is formed. If the iodine chloride is permitted to accumulate in the reaction mixture, olefinic material tends to form even at room temperature. One suitable method for accomplishing this is to conduct the chlorination at an elevated temperature at which the iodine chlorides, mostly iodine monochloride, formed are kept in the vapor phase (temperatures of from 160° C. to 200° C. being generally suitable for this purpose) and to separate the more volatile iodine chlorides from the cotelomer chlorides as they are formed. A suitable technique is to pass the liquid cotelomers and a large excess of gaseous chlorine, or a smaller excess of chlorine mixed with an inert gas, e.g. nitrogen, concurrently through a reaction zone, e.g. a packed column maintained at a temperature of from 160° C. to 200° C. where replacement of iodine by chlorine takes place. The large excess of gas sweeps out the iodine chloride vapor as it forms and removes it from the reaction zone after only a very short contact with the liquid cotelomer iodides. The cotelomer chlorides are separately removed from the bottom of the column substantially free from iodine chlorides.

It has also been noted that chloride ions in general tend to catalyze the loss of HI to form double bonds in the cotelomer iodides of the invention. Thus, lithium chloride, potassium chloride and sodium chloride at temperatures e.g. 100° C. to 150°C. surprisingly react with the cotelomer iodides of the invention terminating in —$CH_2CF_2I$ groups to produce olefins having terminal —$CH=CF_2$ groups. It is thus desirable to exclude these as well as other chloride ion producing materials from the reaction zone when chlorinating the cotelomer iodides.

The cotelomers initially produced by the telomerization reaction, as well as those resulting from the replacement of the terminal iodine atom with hydrogen, fluorine or chlorine may be represented by the general formula $R(Z)_m(CH_2CF_2)_nQ$ where R, Z, $n$ and $m$ are as defined above and where Q is hydrogen, iodine, fluorine or chlorine.

Another suitable procedure for converting the initial cotelomer iodides into more stable products is to subject the initial cotelomers to a coupling reaction in which two moles of cotelomer are coupled end to end by elimination of the terminal iodine atoms between the two molecules. Thus, two moles of cotelomer iodide $$R(Z)_m(CH_2CF_2)_nI$$

may be coupled by the use of ultraviolet light in the presence of mercury in accordance with the following reaction:

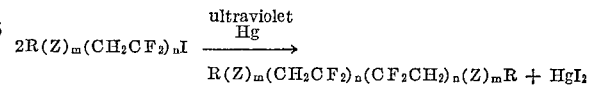

The techniques for carrying out such coupling reactions are described in detail in the copending application of R.N. Haszeldine, Serial No. 526,087, filed August 2, 1955, and now abandoned. Where mixtures of cotelomers are coupled having varying $n$ and $m$ values the value of $n$ and $m$ in each half of the coupled cotelomer will, of course, vary at random. Where mixtures of telomers having different end groups are coupled, the values for R may also be different in the individual coupled compounds.

The new cotelomers of the invention combine the advantages of flame resistance and good chemical and thermal stability with desirable viscosity-volatility and viscosity-temperature properties. The cotelomer oils that may be prepared in accordance with the invention are generally less volatile for a given viscosity and undergo relatively smaller changes in viscosity with temperature than fluorinated oils now available and in some cases display viscosity-temperature relationships approximating those of hydrocarbon oils. They are thus suited as lubricants, hydraulic fluids, damping fluids, and for similar applications where relatively wide variations in temperature are involved making the use of other types of fluorinated oils impossible or inconvenient.

The very marked improvement in viscosity-temperature characteristic displayed by the cotelomers of the invention may be appreciated by comparing the ASTM viscosity slop of cotelomer oils of the invention with other fluorinated telomer oils. The ASTM viscosity slope is the slope of the line expressing viscosity as a function of temperature, plotted on an ASTM (D341–43) viscosity chart. The higher the value of the slope, the higher is the rate of change of viscosity with temperature. Highly fluorinated oils such as those based on the olefin perfluoropropene described and claimed in the copending application of Hauptschein, Braid and Lawlor, Serial No. 701,995 of December 11, 1957, have ASTM slopes of the order of 1.3 to 1.4, while perfluorochloro telomer oils based on the olefin chlorotrifluoroethylene have ASTM slopes of the order of 1. The cotelomer oils of the invention on the other hand display ASTM slopes generally well below 1 and in many cases of the order of 0.7 to 0.8, approaching the slopes displayed by conventional hydrocarbon lubricants.

The invention is illustrated by the following examples.

COTELOMERS OF VINYLIDENE FLUORIDE WITH CHLOROTRIFLUOROETHYLENE

Example 1.—Preparation of Cotelomer Iodide

A 300 ml. Monel metal autoclave is loaded with 105 g. (0.376 mole) of telogen iodide $C_2Cl_2F_3I$. The telogen iodide is prepared by reacting iodine monochloride with $CF_2=CFCl$ at a temperature of 30° to 50° C. at 40 to 70 lbs./in.$^2$ gage, and is a mixture of about 40% of the isomer $CFCl_2CF_2I$ and 60% of the isomer $CF_2ClCFClI$.

The autoclave is cooled in Dry Ice, evacuated, and charged by gaseous transfer in vacuo with 48 g. (0.411 mole) of chlorotrifluoroethylene. After further cooling in liquid nitrogen, 138 g. (2.16 moles) of vinylidene fluoride is condensed in the autoclave. The autoclave is then heated with shaking at 165° to 182° C. for 6.5 hours during which the pressure drops from 4500 lbs./in.$^2$ gage to about 1050 lbs./in.$^2$ gage.

At the end of the reaction period the autoclave is cooled and recovery of the volatile unreacted olefins is made by condensation in liquid nitrogen-cooled receivers. The olefin mixture (about 52 g.) is analyzed spectroscopically and shown to consist of 95 mole percent $CF_2=CH_2$ and 5 mole percent $CF_2=CFCl$.

The liquid products from the autoclave consist of a mixtures of cotelomer iodides of the formula

$$C_2Cl_2F_3(CF_2CFCl)_m(CH_2CF_2)_nI$$

The average ratio of vinylidene fluoride to chlorotrifluoroethylene units in the cotelomer chain (i.e. the $n{:}m$ ratio) is 79:21 as determined by the usage ratio of the two olefins. The total number of olefin units (i.e. $n+m$), ranges between about 3 and 20, the average value of $n+m$ being about 6. The total liquid product from the autoclave is distilled in a small Vigreux distillation unit under reduced pressure to produce the following fractions:

(a) About 93 g. of a fraction of the above cotelomer iodide boiling up to 125° C. at about 0.1 mm. Hg and consisting of cotelomer iodides in which the value of $n+m$ ranges from about 3 to 6.

(b) 135 g. of a mixture of cotelomer iodides of the above formula, a viscous oil, boiling over 125° C. at 0.1 mm. Hg, the value of $n+m$ ranging from about 5 to 20 and having an average value of about 6.5.

The infra red spectra of the above cotelomers, as well as of the cotelomer iodides of vinylidene fluoride and chlorotrifluoroethylene prepared in accordance with Examples 4, 6 and 8 to 16 inclusive, have the following characteristic absorption bands: 3.32±.02, 3.36±.02, 7.02±.02, 7.18±.02, 7.30±.02 (shoulder), 8.10±.03 (shoulder), 8.52±.08, 9.32±.03, 10.43±.03, 10.08±.02, 11.25±.03, 11.90±.02, 12.87±.03, 13.12±.03, 13.32±.02, 14.33±.02, and 14.87±.03μ.

The ultraviolet spectra of the above cotelomor iodides, as well as of the cotelomer iodides of Examples 4, 6 and 8 to 16, inclusive, have maxima at 269.5–270 mμ. This corresponds to the value for the —$CH_2CF_2I$ chromophore, namely 270 mμ. This value is about 20 mμ further to the blue part of the spectrum than for the —$CF_2CFClI$ chromophore which has a characteristic maximum at 290 mμ. From this it is apparent that these cotelomer iodides containing ($CH_2CF_2$) and ($CF_2CFCl$) olefin units terminate predominantly or entirely in $CH_2CF_2I$ end groups, little or no cotelomer terminating in —$CF_2CFClI$ groups being present.

Fraction (a), consisting mostly of cotelomers in which the value of $n+m$ is less than 5 is of relatively low viscosity and not therefore suitable for use as lubricants or the like. Although these cotelomer iodides have uses in themselves particularly when stabilized by replacement of the iodine with chlorine, such as for dielectric or heat transfer fluids, they may if desired be further reacted with additional olefin with or without additional telogen, and converted into cotelomers of higher molecular weight of suitable viscosity for use as lubricants, hydraulic fluids and the like.

Fraction (b) containing cotelomers in which the average value of $n+m$ is of the order of 6.5 is of suitable viscosity for lubricant uses, but is preferably chlorinated or fluorinated to replace the iodine atom with chlorine or fluorine following procedures such as those described in the following examples in order to increase the chemical and thermal stability of the cotelomer.

Example 2.—Chlorination of Cotelomer Iodide

Cotelomer iodides corresponding to fraction (b) of Example 1 are heated to a temperaturre of 170° C. and then metered drop by drop (while excluding oxygen) downwardly into the top of a vertical glass tube packed with glass helices and evenly heated by a furnace to a temperature of 170° to 190° C. An excess of chlorine preheated to 170° C. is passed into the top of the column and flows downwardly concurrently with the liquid cotelomer iodide. Replacement of iodine by chlorine and formation of iodine chlorides occur. The iodine chlorides separate from the liquid cotelomers as a vapor and the vapor is swept downwardly through the column by the stream of chlorine. At the bottom of the column, the descending mixture of chlorine and iodine chloride vapor is swept out of the column by a stream of nitrogen introduced near the bottom of the column for this purpose. The liquid cotelomer chlorides flow out of the bottom of the column into a receiving flask. By the above procedure the iodine chlorides formed during the chlorination are removed from the reaction zone after only a very short contact with the cotelomer. The product consists substantially entirely of cotelomer chlorides of the formula

$$C_2Cl_2F_3(CF_2CFCl)_m(CH_2CF_2)_nCl$$

where the average value of $n+m$ is of the order of 6.5. This product is essentially free from olefinic material. This cotelomer oil has an ASTM viscosity-temperature slope of 0.76 and the following viscosities at the temperatures indicated:

| Temperature, ° F.: | Viscosity, centistokes |
| --- | --- |
| 100 | 230 |
| 110 | 158 |
| 140 | 64 |
| 155 | 44 |
| 170 | 32 |
| 190 | 20.5 |
| 200 | 17 |

Example 3.—Fluorination of Cotelomer Iodides

Cotelomer iodides corresponding approximately to fraction (b) of Example 1 of the formula

$$C_2Cl_2F_3(CF_2CFCl)_m(CH_2CF_2)_nI$$

where the average value of $n+m$ is about 6.5, are mixed with a slight molar excess of $SbF_3Cl_2$, trifluorotrichloroethane solvent, and the mixture placed in a stainless steel autoclave which is heated while shaking at 100° C. for two hours. The autoclave is cooled in an ice bath and vented. The reaction mixture is then poured over ice and water and washed with aqueous sodium bisulfite, sodium carbonate (10%) and water. After drying over anhydrous magnesium sulfate the trifluorotrichloroethane is evaporated on a steam bath to give a viscous oil consisting of a mixture of cotelomer fluorides of the formula $$C_2Cl_2F_3(CF_2CFCl)_m(CH_2CF_2)_nF$$

where the average value of $n+m$ is about 6.5, having an ASTM viscosity-temperature slope of the order of 0.75.

*Example 4.—Preparation of Cotelomer Iodide*

Following the procedures of Example 1, 120 g. of (0.430) of telogen iodide $C_2Cl_2F_3I$, 50 g. (0.429 mole) of $CF_2=CFCl$ and 124 g. (1.94 moles) of $CF_2=CH_2$ are introduced into a 300 cc. nickel autoclave. The molar ratio of $CH_2=CF_2:CF_2=CFCl:C_2Cl_2F_3I$ is 4.5:1:1. The iodide $C_2Cl_2F_3I$ is a mixture of isomers prepared by the addition of ICl to $CF_2=CFCl$ and containing 85% $CFCl_2CF_2I$ and 15% $CF_2ClCFClI$.

The autoclave and contents are heated with shaking at 180° to 200° C. for 4.75 hours. The pressure drops during this period from 4700 to 1000 lbs./in.² gage.

Upon venting autoclave there is recovered 30 g. of $CH_2=CF_2$ and about 3 g. of $CF_2=CFCl$, the molar ratio of $CH_2=CF_2:CF_2=CFCl$ in the recovered olefin mixture being 95:5.

The liquid products remaining in the autoclave (247 g.) consist of a mixture of cotelomer iodides of the formula $C_2Cl_2F_3(CF_2CFCl)_m(CH_2CF_2)_nI$ in which the value of $n+m$ ranges from about 3 to 25, the average value being about 7. The average ratio of $n:m$ in the cotelomers, determined as described in Example 1, is about 78:22. The conversion based on starting vinylidene fluoride is about 76%.

The liquid products from the autoclave are fractionally distilled under reduced pressure and the following fractions obtained:

(a) 23 g. of a reddish liquid boiling up to 32° C. at about 0.1 mm. Hg consisting of unreacted $C_2Cl_2F_3I$ mainly $CFCl_2CF_2I$ and low molecular weight telomer iodides where $n+m$ equals about 2.

(b) 100 g. of a pink oil having a boiling range of 32° to 125° C. at about 0.1 mm. Hg and a refractive index $n_D^{26}$ 1.4210, consisting mainly of low molecular weight cotelomers in which the value of $n+m$ is in the range of from 3 to 7.

(c) 124 g. of a viscous, almost colorless oil boiling from 125° C. to >250° C. at about 0.1 mm. Hg having a refractive index $n_D^{26}$ 1.4109 for which the analysis corresponds with an average molar ratio of vinylidene fluoride to chlorotrifluoroethylene units in the cotelomer chain of 83:17. Analysis: Calculated for $C_{14}H_{10}F_{16}Cl_3I$: C, 23.6. Found: C, 24.1.

*Example 5.—Chlorination of Cotelomer Iodide*

A portion of fraction (c) of Example 4 boiling above 175° C. is chlorinated to replace the terminal iodine with chlorine following the procedures described in Example 2. The chlorinated product consists of a mixture of cotelomer chlorides of the formula $$C_2Cl_2F_3(CF_2CFCl)_m(CH_2CF_2)_nCl$$

in which the average value of $n+m$ is about 7.5 and in which the ratio of $n:m$ is about 83:17. The cotelomer chloride oil has an ASTM viscosity-temperature slope of 0.75 and the following viscosities for the temperatures indicated:

| Temperature, °F.: | Viscosity, centistokes |
|---|---|
| 100 (extrapolated) | 610 |
| 120 | 277 |
| 140 | 125 |
| 160 | 77 |
| 180 | 49 |
| 200 | 30 |

A fraction of cotelomer iodides from a similar run in which the average value of $n+m$ is 8.5 is likewise chlorinated. The resulting cotelomer chlorides boiling above 200° C. at less than 0.1 mm. has an ASTM viscosity-temperature slope of 0.68 and the following viscosities for the temperatures indicated:

| Temperature, °F.: | Viscosity, centistokes |
|---|---|
| 100 | 1900 |
| 120 | 781 |
| 160 | 204 |
| 200 | 71 |

*Example 6.—Preparation of Cotelomer Iodides*

Following the procedure described in Example 1, 104.5 g. (0.375 mole) of telogen iodide $C_2Cl_2F_3I$, 45 g. (0.386 mole) of chlorotrifluoroethylene, and 121 g. (1.89 mole) of 1,1-difluoroethylene is introduced into a 300 cc. Monel metal autoclave. The molar ratio of $$CF_2=CH_2:CF_2=CFCl:C_2Cl_2F_3I$$

is 5:1:1. The telogen iodide $C_2Cl_2F_3I$ consists of a mixture of isomers containing approximately 60% $CFCl_2CF_2I$ and approximately 40% $CF_2ClCFClI$.

The autoclave and contents are heated at 190 to 200° C. for 3.5 hours. During this period the pressure drops from 3900 to 1000 lbs./in.² gage.

Upon venting the autoclave unreacted olefin consisting of 34 g. of $CF_2=CH_2$ and 4 g. of $CF_2=CFCl$ is recovered in liquid nitrogen cooled traps, the molar ratio of $$CF_2=CH_2:CF_2=CFCl$$

in the mixture being 94:6.

The liquid products from the autoclave consists of a mixture of cotelomer iodides of the formula $$C_2Cl_2F_3(CF_2CFCl)_m(CH_2CF_2)_nI$$

where the value of $n+m$ ranges from 2 to 15, the average value being about 5. The overall average molar ratio of vinylidene fluoride to chlorotrifluoroethylene olefin units is 80:20. The conversion based on vinylidene fluoride is 72%.

The liquid products are fractionally distilled at a pressure of about 0.1 mm. Hg and the following fractions collected.

(a) 9 g. of a pink liquid which condenses in the liquid nitrogen cooled trap consisting mostly of unreacted $C_2Cl_2F_3I$ almost entirely the $CF_2Cl_2CF_2I$ isomer.

(b) 66 g. having a boiling point up to 100° C. at 0.1 mm. Hg of a pink light oil having a refractive index $n_D^{27}$ 1.4199 comprising cotelomer iodides of the above formula in which the value of $n+m$ ranges from 3 to 6.

(c) 47.5 g. of a somewhat viscous pink oil having a boiling range of from 100 to 150° C. at 0.1 mm. Hg, a refractive index $n_D^{28}$ 1.4130 consisting mainly of cotelomer iodides of the above formula in which the value of $n+m$ is in the range 4–7.

(d) 40 g. of an almost colorless oil of medium viscosity having a boiling range of 150° to 200° C. at less than 0.1 mm. Hg consisting of cotelomer iodides of the above formula in which the ratio of $n:m$ is about 85:15. Analysis: Calculated for $C_{15}H_{11}F_{17}Cl_3I$: C, 24.2; I, 17.0. Found: C, 24.3; I, 16.0.

(e) 25 g. of a viscous oil having a boiling range of 200° to 242° C. at about 0.1 mm. Hg and a refractive index $n_D^{28}$ 1.4075, consisting of cotelomer iodides of the above formula in which the value of $n+m$ ranges from about 7–10.

(f) 17 g. of a barely flowing oil cloudy at room temperature remains undistilled having a refractive index $n_D^{26}$ 1.4043 consisting of cotelomer iodides of the above formula in which the value of $n+m$ ranges from 9 to 20.

*Example 7.—Chlorination of Cotelomer Iodides*

Cotelomer iodides corresponding to fraction (d) of for the reaction times and at the temperatures and pressures indicated in Table 1.

At the end of the reaction, the autoclave in each case is cooled and volatile components of the reaction mixture are collected by condensation in vacuo in liquid nitrogen cooled receivers and analyzed spectroscopically. The liquid products, consisting of cotelomer iodides of the formula $C_2Cl_2F_3(CF_2CFCl)_m(CH_2CF_2)_nI$ are then fractionated in small Vigreux units to separate the rela-

TABLE 1

| Example No. | Reactants | | | Mole ratio, $CF_2=CH_2$: $CF_2=CFCl$: $C_2Cl_2F_3I$ | Reaction time, hr. | Reaction temp. °C. |
|---|---|---|---|---|---|---|
| | $CF_2=CH_2$ | $CF_2=CFCl$ | $C_2Cl_2F_3I$ | | | |
| 8 | 125 grams (1.96 mole) | 51 grams (.437 mole) | 120 grams[a] (.430 mole) | 4.5:1:1 | 4.5 | 175–200 |
| 9 | 113 grams (1.77 mole) | 41 grams (.351 mole) | 97.5 grams[b] (.350 mole) | 5:1:1 | 5.5 | 180 |
| 10 | 131 grams (2.05 mole) | 45 grams (.386 mole) | 120 grams[a] (.430 mole) | 5.3:1:1.1 | 5.25 | 175–200 |
| 11 | 129 grams (2.02 mole) | 48 grams (.411 mole) | 224 grams[a] (.802 mole) | 5:1:2 | 4 | 160–185 |
| 12 | 125 grams (1.96 mole) | 46 grams (.395 mole) | 100 grams[c] (.358 mole) | 5.5:1.1:1 | 6.5 | 170–200 |
| 13 | 131 grams (2.05 mole) | 52 grams (.446 mole) | 105 grams[a] (.376 mole) | 5.5:1.2:1 | 22.5 | 168 |
| 14 | 137 grams (2.14 mole) | 50 grams (.429 mole) | 100 grams[c] (.358 mole) | 6:1.2:1 | 4.5 | 170–200 |
| 15 | 136 grams (2.13 mole) | 41 grams (.351 mole) | 97.5 grams[a] (.350 mole) | 6:1:1 | 5.5 | 200 |
| 16 | 160 grams (2.50 mole) | 29 grams (.249 mole) | 70 grams[b] (.250 mole) | 10:1:1 | 2 | 190–200 |

| Example No. | Pressure | | Reaction products | | | | | | Overall ratio of olefin units $(CH_2=CF_2$: $CF_2=CFCl)$ in cotelomer product | Percent conversion based on $CH_2=CF_2$ |
|---|---|---|---|---|---|---|---|---|---|---|
| | | | Volatiles | | | Cotelomer product | | | | |
| | | | | Composition | | | | | | |
| | Initial p.s.i.g. | Final p.s.i.g. | Weight, g. | $CF_2=CH_2$, mole percent | $CF_2=CFCl$, mole percent | Total weight, g. | Weight percent boiling above 125° C. at 0.1 mm. Hg | Weight percent boiling below 125° C. at 0.1 mm. Hg | | |
| 8 | 4,500 | 1,200 | 40 | 95 | 5 | 247 | 50 | 50 | 77:23 | 71 |
| 9 | 2,900 | 1,450 | 69 | 85 | 15 | 183 | 26 | 74 | 82:18 | 54 |
| 10 | 4,800 | 1,300 | 39 | 95 | 5 | 254 | 53 | 47 | 81:19 | 73 |
| 11 | 7,000 | 3,300 | 53 | 78 | 22 | 336 | 17 | 83 | 85:15 | 73 |
| 12 | 3,700 | 900 | 25 | 95 | 5 | 230 | 56 | 44 | 81:19 | 82 |
| 13 | 4,000 | 1,100 | 46 | 94 | 6 | 226 | 52 | 48 | 78:22 | 68 |
| 14 | 4,200 | 950 | 40 | 94 | 6 | 246 | 65 | 35 | 80:20 | 74 |
| 15 | 4,600 | 1,050 | 40 | 86 | 14 | 229 | 71 | 29 | 86:14 | 78 |
| 16 | 5,100 | 2,150 | 78 | 92 | 8 | 163 | 64 | 36 | 90:10 | 58 |

[a] About 85% of the isomer $CFCl_2CF_2I$ and 15% $CF_2ClCFClI$.
[b] About 60% of the isomer $CFCl_2CF_2I$ and 40% $CF_2ClCFClI$.
[c] About 40% of the isomer $CFCl_2CF_2I$ and 60% $CF_2ClCFClI$.

Example 6 consisting of cotelomers in which the average value of $n+m$ is about 6.5 is chlorinated at 160° to 190° C. following the procedures described in Example 2. The product consists of cotelomer chlorides of the formula $C_2Cl_2F_3(CF_2CFCl)_m(CH_2CF_2)_nCl$ where the average value of $n+m$ is 6.5 and where the molar ratio of $n:m$ is 85:15, having an approximate boiling range of from 150° C. to 200° C. at about 0.1 mm. Hg. The ASTM viscosity-temperature slope of this moderately viscous oil is 0.74 with the following viscosities at the temperatures indicated:

| Temperature, °F.: | Viscosity, centistokes |
|---|---|
| 90 | 306 |
| 100 | 215 |
| 110 | 146 |
| 140 | 60.5 |
| 155 | 41 |
| 170 | 31 |
| 190 | 19 |

*Examples 8 to 16.—Preparation of Cotelomer Iodides*

Cotelomer iodides of vinylidene fluoride and chlorotrifluoroethylene are prepared using varying molar ratios of vinylidene fluoride to chlorotrifluoroethylene and varying molar ratios of total olefin to telogen iodide. In each case the telogen iodide is $C_2Cl_2F_3I$, prepared by the addition of ICl to the olefin $CF_2=CFCl$ and consisting of a mixture of the isomers $CF_2ClCFClI$ and $CFCl_2CF_2I$. In all cases the reactants are introduced into a Monel metal or nickel autoclave following the procedures described in Example 1. The autoclave is then heated with shaking tively light oils (in which the volume of $n+m$ is less than 5) from the heavier oils having a viscosity suitable for lubricant, hydraulic fluid and the like uses. The molar ratio of vinylidene fluoride ($CH_2CF_2$) units to chlorotrifluoroethylene ($CF_2CFCl$) units in the co-telomer is determined in each case in the same manner as explained in Example 1. The results of these examples are summarized in Table 1.

From the data in Table 1 it may be noted that increasing the molar ratio of vinylidene fluoride to chlorotrifluoroethylene in the reaction mixture tends generally to increase the proportion of vinylidene fluoride units in the cotelomer, although the proportion of vinylidene fluoride in the cotelomer product is generally somewhat lower than its proportion in the reaction mixture. In Example 16, at a 10:1 molar ratio of $CH_2=CF_2:CF_2=CFCl$ in the reaction mixture, the molar ratio of vinylidene fluoride to chlorotrifluoroethylene units in the cotelomer is 90:10 in contrast to Example 8 where this ratio is 77:23.

As also indicated by the data in Table 1, as the molar ratio of total olefin to telogen iodide increases, the average molecular weight of the cotelomer product increases. Thus, in Example 11, where the ratio of total olefin to telogen iodide is 3:1 the major part of the product contains less than an average of 4 olefin units per cotelomer molecule, whereas in Example 15 at a 7:1 ratio the major part of the product consists of higher molecular weight telomers. In Example 16 approximately 60% by weight of the product consists of telomers which are solids at room temperature. This relatively high proportion of solids in the product is due both to the high total olefin:telogen ratio which tends to produce higher molecular weight cotelomers and to the relatively small proportion of chlorotrifluoroethylene units in the cotelomer which also tends to favor the formation of solids at a given molecular weight.

The cotelomers of vinylidene fluoride with chlorotrifluoroethylene containing a minor proportion of the latter olefin, represent a particularly preferred embodiment of the invention. These cotelomers have excellent chemical and thermal stability. They have good to excellent viscosity-temperature properties due to the major proportion of vinylidene units in the cotelomer chain. They provide oils of suitable viscosity for lubricants and hydraulic fluids and the like which are liquids at normal or slightly above normal temperature apparently due to the minor amount of chlorotrifluoroethylene units in the cotelomer chain. To prepare these cotelomers the telogen iodide $C_2Cl_2F_3I$ prepared by the addition of iodine monochloride to chlorotrifluoroethylene is preferably employed since in this way, the second olefin, namely chlorotrifluoroethylene also furnishes the required telogen.

Preferred reaction conditions for the preparation of cotelomer iodides of vinylidene fluoride and chlorotrifluoroethylene are temperatures of from 150° C. to 200° C., pressures of from 1000 to 10,000 lbs./in.$^2$ gage, total olefin to iodide ratios of from 4:1 to 10:1, and molar ratios of $CH_2=CF_2:CF_2=CFCl$ of from 4:1 to 8:1.

COTELOMERS OF VINYLIDENE FLUORIDE AND PERFLUOROPROPENE

Example 17.—Preparation of Cotelomer Iodide

A 300 cc. Monel metal autoclave is charged with 187 g. (0.599 mole) of $CF_2ClCFICF_3$, prepared by the addition of iodine monochloride to perfluoropropene, and is cooled in Dry Ice. By vacuum transfer, 92 g. (0.613 mole) of perfluoropropene $CF_2=CFCF_3$ is introduced into the autoclave, and, after further cooling in liquid nitrogen, 77 g. (1.20 mole) of vinylidene fluoride is similarly admitted. The molar ratio of $$CF_2=CH_2:CF_2=CFCF_3:CF_2ClCFICF_3$$

is 2:1:1. The autoclave is heated with shaking at 200 to 220° C. for 2.75 hours. The pressure drops during the period from 3900 to 450 lbs./in.$^2$ gage.

Following this reaction period, the autoclave is vented and there is recovered in liquid nitrogen cooled traps 51 g. of olefin shown by infrared spectroscopic analysis to consist of 6 mole percent $CF_2=CH_2$ and 94 mole percent $CF_2=CFCF_3$.

The liquid products consist of cotelomer iodides of the formula $CF_2ClCF(CF_3)[CF_2CF(CF_3)]_m[CH_2CF_2]_nI$ in which the value of $n+m$ ranges from about 3 to 15, the average value being about 5. From the olefin usage ratio the overall average ratio of $CF_2=CH_2:CF_2=CFCF_3$ in the cotelomer product (i.e. the ratio of $n:m$) is determined to be 81:19. These liquid products are distilled in a small Vigreux distillation unit at reduced pressure and the following fractions are obtained:

(a) 53 g. of a pink light liquid boiling up to 37° C. at about 0.1 mm. Hg having a refractive index $n_D^{30}$ 1.385 consisting of cotelomer iodides of the above formula in which the average value of $n+m$ is about 3.5.

(b) 112 g. of a light pink oil having a boiling range of 37° to 57° C. (mainly from 55° to 57° C.) at about 0.1 mm. Hg and a refractive index $n_D^{28}$ of 1.3807, consisting of cotelomer iodides of the above formula in which the average value of $n+m$ is about 4.

(c) 71 g. of a pink oil of light to moderate viscosity having a boiling range of 57 to 80° C. (mainly 66° to 70° C.) at about 0.1 mm. Hg, and a refractive index $n_D^{28}$ 1.3737, consisting mostly of cotelomer iodides in which the value of $n+m$ ranges from 4 to 5.

(d) 16 g. of a pink oil of medium viscosity having a boiling range of from 80 to 95° C. at about 0.1 mm. Hg, and a refractive index $n_D^{28}$ 1.3703, consisting of cotelomer iodides of the above formula in which the value of $n+m$ ranges from about 5 to 6.

(e) 27 g. of a pink viscous oil having a boiling range of from 95 to 120° C. at about 0.1 mm. Hg, a refractive index $n_D^{28}$ of 1.3685, consisting essentially of cotelomer iodides of the above formula in which the value of $n+m$ ranges from about 5 to 7.

(f) 8 g. of a pink heavy oil having a boiling range of 120 to 180° C. at about 0.1 mm. Hg, and a refractive index $n_D^{28}$ 1.3660, consisting essentially of cotelomer iodides of the above formula in which the value of $n$ ranges from about 6 to 8.

(g) A residue of 2.5 g. of a slightly yellow oil remains undistilled.

Characteristic absorption maxima in the infrared spectra of the cotelomers prepared as described above as, well as for the cotelomer iodides of vinylidene fluoride and perfluoropropene prepared in accordance with Examples 19 and 21 are as follows: 3.33±.01, 3.37±.01, 7.03±.01, 7.18±0.03, 7.43±.02, 7.85±.01, 8.28±.04, 9.42±.02, 9.55±.01, 10.45±.01, 10.82±.02, 11.25±.01, 13.04±.02, 13.9±0.06, 14.65±.05µ. The increased intensities of the 7.4 and 10.8µ bands and the band at 9.4µ are attributed to incorporated perfluoropropene.

It is believed that the cotelomers terminate predominately or entirely in —$CH_2CF_2I$ groups since the iodine to carbon bond in the —$CF_2I$ group is more stable than that in the $$\begin{array}{c} CF_3 \\ | \\ -CFI \end{array}$$

group, and consequently, it is more probable that chain termination will occur with a vinylidene fluoride unit providing the more stable —$CF_2I$ end group.

Example 18.—Chlorination of Cotelomer Iodide

Combined fractions (e), (f) and (g) of Example 17 are chlorinated at a temperature of 170 to 190° C. following the procedures described in Example 2. The product consists of cotelomer chlorides of the formula $$CF_2ClCF(CF_3)[CF_2CF(CF_3)]_m[CH_2CF_2]_nCl$$

where the average value of $n+m$ is about 7 and where the ratio of $n:m$ is of the order of 85:15. This oil has an ASTM viscosity-temperature slope of the order of 0.7.

Example 19.—Preparation of Cotelomer Iodide

Following the procedures of Example 17, 156 g. (0.500 mole) of $CF_2ClCFICF_3$, 75 g. (0.500 mole) of $CF_2=CFCF_3$, and 96 g. (1.50 moles) of $CF_2=CH_2$ (3:1:1 molar ratio of $CF_2=CH_2:CF_2=CFCF_3:CF_2ClCFICF_3$) are introduced into a 300 cc. Monel metal autoclave. The autoclave and contents are shaken for 5.25 hours at a temperature of 200 to 215° C. during which the pressure drops from 4000 to 400 lbs./in.$^2$ gage.

Upon venting the autoclave there is obtained 35 g. of unreacted olefins in which the molar ratio of $$CF_2=CH_2:CF_2=CFCF_3$$

is 85:15 as determined by infrared spectroscopic analysis. The liquid product from the autoclave (295 g.) consists of cotelomer iodides of the formula $$CF_2ClCF(CF_3)[CF_2CF(CF_3)]_m[CH_2CF_2]_nI$$

where the value of $n+m$ ranges from about 3 to 25, the average value being about 5. The conversion to liquid products based on $CF_2=CH_2$ is 97%. The overall average ratio in the cotelomer product of $$CF_2=CH_2:CF_2=CFCF_3$$

is determined by the olefin usage ratio to be 84:16. Upon the distillation of the liquid products under reduced pressure the following fractions are obtained:

(a) 143 g. of a pink light oil having a boiling range of 56° C. at 45 mm. Hg to 96° C. at about 0.1 mm. Hg, consisting of cotelomer iodides of the above formula in which the value of $n+m$ ranges from about 3 to 5.

(b) 78 g. of a pink oil of moderate viscosity having a boiling range of 96° to 120° C. at about 0.1 mm. Hg and a refractive index $n_D^{29}$ 1.3778, consisting of cotelomer iodides of the above formula in which the value of $n+m$ ranges from 4 to 6.

(c) 24 g. of an almost colorless viscous oil having a boiling range of 120 to 135° C. at about 0.1 mm. Hg and a refractive index $n_D^{29}$ 1.3745, consisting of cotelomer iodides of the above formula in which the value of $n+m$ ranges from 6 to 7.

(d) 41 g. of a pink viscous oil having a boiling range of 135 to above 175° C. at about 0.1 mm. Hg, and a refractive index $n_D^{30}$ 1.3716 consisting of cotelomer iodides of the above formula where the value of $n+m$ ranges from 7 to 10.

(e) A small residue of 1.4 g., liquid at room temperature remains undistilled.

*Example 20.—Fluorination of Cotelomer Iodide*

Cotelomer iodides corresponding to fraction (d) of Example 19 are mixed with a slight molar excess of $SbF_3Cl_2$, trifluorotrichloroethane solvent and the mixture is placed in a stainless steel autoclave and heated while shaking at 100° C. for 2 hours. The reaction mixture is poured over ice and water and washed with aqueous sodium bisulfite, sodium carbonate and water and then dried over anhydrous magnesium sulfate after which the trifluorotrichloroethane solvent is evaporated. The fluorinated product consists of cotelomer fluorides of the formula $CF_2ClCF(CF_3)[CF_2CF(CF_3)]_m[CH_2CF_2]_nF$ in which the average value of $n+m$ is about 8. The approximate molar ratio of vinylidene fluoride to perfluoropropene units in the cotelomer chain (i.e. the $n:m$ ratio) is of the order of 95:5. The fluorinated oil has an ASTM viscosity-temperature slope of the order of 0.7.

*Example 21.—Preparation of Cotelomer Iodide*

Following the procedures of Example 19, 80 g. (0.256 mole) of $CF_2ClCFICF_3$, 115 g. (0.768 mole) of $CF_2=CFCF_3$ and 82 g. (1.28 moles) of $CF_2=CH_2$ (molar ratio of $CF_2=CH_2:CF_2=CFCF_3:CF_2ClCFICF_3$ of 5:3:1) are introduced into a 300 cc. Monel metal autoclave. The autoclave and contents are heated with shaking for 5 hours at 200 to 215° C. during which period the pressure drops from 5200 to 2200 lbs./in.² gage.

The autoclave is vented and 86 g. of a mixture of unreacted olefins is collected in liquid nitrogen cooled trap. Spectroscopic analysis of this olefin mixture shows it to consist of 40 mole percent $CF_2=CH_2$ and 60 mole percent of $CF_2=CFCF_3$.

The liquid product from the autoclave consists of cotelomer iodides of the formula

in which the value of $n+m$ ranges from about 3 to 30, the average value being about 6. From the olefin usage ratio it is determined that the over-all average ratio of $CF_2=CH_2:CF_2=CFCF_3$ units in the cotelomer (i.e. the ratio of $n:m$) is 75:25. Over-all conversion based on $CF_2=CH_2$ is 77%.

The liquid products are distilled under reduced pressure in a small Vigreux distillation unit to obtain the following fractions:

(a) 68 g. of an oil boiling up to 96° C. at about .01 mm. Hg, having a refractive index $n_D^{25}$ 1.3847, consisting of cotelomer iodides of the above formula where the value of $n+m$ ranges from about 3 to 5.

(b) 22 g. of an oil having a boiling range of 96° to 124° C. at about 0.1 mm. Hg, and a refractive index $n_D^{26}$ 1.3790, consisting of cotelomer iodides of the above formula where the value of $n+m$ ranges from about 4 to 6.

(c) 22 g. of an oil of medium viscosity having a boiling range of 124° to 137° C. at about 0.1 mm. Hg, and a refractive index $n_D^{27}$ 1.3769, consisting of cotelomer iodides of the above formula where the value of $n+m$ ranges from about 6 to 7.

(d) 23 g. of a heavy oil having a boiling range of 137° to 166° C. at about 0.1 mm. Hg, a refractive index $n_D^{30}$ 1.3747, consisting of cotelomer iodides of the above formula in which the value of $n+m$ ranges from about 7 to 9.

(e) 11 g. of a viscous oil having a boiling range of 146 to 180° C. at less than 0.1 mm. Hg, and a refractive index $n_D^{20}$ 1.3763, consisting of cotelomer iodides of the above formula where the value of $n+m$ ranges from about 8 to 12.

(f) 13 g. of a viscous oil having a boiling range of 180° to 195° C. at less than 0.1 mm. Hg, and a refractive index $n_D^{20}$ 1.3765, consisting of cotelomer iodides of the above formula where the value of $n+m$ ranges from about 11 to 15.

(g) A residue of 4 g., liquid at room temperature, remains undistilled.

*Example 22.—Chlorination of Cotelomer Iodides*

Combined fractions (c) and (d) of the cotelomer iodides prepared in accordance with Example 21 are chlorinated to replace the terminal iodine with chlorine at a temperature of 180° C. following the procedures of Example 2. The chlorinated product consists of cotelomer chlorides of the formula

where the average value of $n+m$ is about 7 and where the approximate ratio of $n:m$ is 80:20. This oil has an ASTM viscosity-temperature slope of the order of 0.7.

*Example 23.—Preparation of Cotelomer Iodides of $CH_2=CF_2$ and $CF_2=CHCl$*

Taking care to exclude air and moisture, a 300 cc. Monel metal autoclave is loaded with a mixture of 103 g. (0.330 mole) of $CF_2ClCFICF_3$, 65 g. (0.660 mole) of $CF_2=CHCl$ and 85 g. (1.33 mole) of $CH_2CF_2$ (molar ratio of $CH_2=CF_2:CF_2CHCl:CF_2ClCFICF_3$ of 4:2:1). The autoclave and contents are shaken at 200° C. for 4.75 hours during which period the pressure drops from 2800 to 1300 lbs./in.² gage.

Upon venting the autoclave 83 g. of volatiles are collected in a refrigerated trap and shown by infrared spectroscopic analysis to consist of 45 mole percent $CF_2=CHCl$ and 55 mole percent $CH_2=CF_2$.

The liquid products remaining in the autoclave consist of cotelomer iodides of the formula

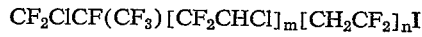

where the value of $n+m$ ranges from about 3 to 15, the average value of $n+m$ being about 5. The over-all average ratio of vinylidene fluoride to units from the olefin $CF_2=CHCl$ in the cotelomer chain (i.e. the average value of $n:m$) as determined from the composition of the recovered olefin mixture, is about 80:20. The over-all conversion based on $CH_2=CF_2$ is 56%. The liquid products from the autoclave are distilled under reduced pressure in a small Vigreux distillation unit and the following fractions are obtained:

(a) 41 g. of a light pink oil having a boiling range of from 60° to 86° C. at about 99 mm. Hg, and a refractive index $n_D^{26}$ 1.3860.

(b) 83.5 g. of a moderately viscous oil having a boiling range of 56° to 80° C. at less than 0.1 mm. Hg, and a refractive index $n_D^{26}$ 1.3931, consisting of cotelomer iodides of the above formula in which the value of $n+m$ ranges from about 3 to 5.

(c) 13 g. of an oil of medium viscosity having a boiling range of 80° to 91° C. at less than 0.1 mm. Hg, and a refractive index $n_D^{26}$ 1.3991, consisting of cotelomer iodides in which the value of $n+m$ ranges from about 4 to 6.

(d) 7 g. of a viscous oil having a boiling range of from 91° to 110° C. at less than 0.1 mm. Hg, and a refractive index $n_D^{26}$ 1.4011, consisting of cotelomer iodides of the above formula in which the value of $n+m$ ranges from about 5 to 8.

(e) A residue of 1.5 g. remains undistilled.

The infrared spectra of the above cotelomer iodides have characteristic absorption maxima at 3.34±.01, 7.03±.02, 7.85±.03, 9.50±.05, 10.41±.04, 10.83±.02, 11.28±.03, 13.07±.03, and 14.68±.09μ in common with homotelomer iodides of vinylidene fluoride $$CF_2ClCF(CF_3)(CH_2CF_2)_nI$$

In addition, the cotelomer iodides have characteristic absorptions at 7.24±.08, 7.46±.03, 8.31±.03, 8.46±.03, 8.92±.06, 9.98±.02, 11.93±.03, 12.23±.03, 13.71±.02, 14.15±.09, and 15.3μ in their infrared spectra. The bands at 7.46, 8.92, 9.98, and 12.23μ are particularly useful in differentiating between homotelomer iodides of 1,1-difluoroethylene and cotelomer iodides with $CF_2=CHCl$.

It is believed that these cotelomers terminate predominately if not entirely in $-CH_2CF_2I$ end groups due to the greater band energy of the $-CF_2I$ band in comparison with the CHClI band.

*Example 24.—Chlorination of Cotelomer Iodides of $CF_2=CH_2$ and $CF_2=CHCl$*

Combined fractions (b) (c) (d) and (e) of the cotelomer iodides prepared in accordance with Example 23 are chlorinated at a temperature of from 170 to 190° C. following the procedures of Example 2. The chlorinated product consists of cotelomer chlorides of the formula $CF_2ClCF(CF_3)[CF_2CHCl]_m[CH_2CF_2]_nCl$ in which the average value of $n+m$ is about 5 and in which the $n:m$ ratio is about 85:15. This oil, which has an ASTM viscosity-temperature slope in the order of 0.8 is useful as a lubricant or hydraulic fluid or the like particularly where the combination of good chemical and thermal stability and viscosity-temperature properties are desired.

This application is a continuation-in-part of our co-pending application Serial No. 663,005, filed June 3, 1957, and now abandoned for Fluorinated Organic Compounds.

We claim:

1. Cotelomers of the formula $R(Z)_m(CH_2CF_2)_nQ$ 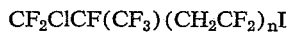 where R is selected from the class consisting of perfluoroalkyl and perfluorochloroalkyl radicals having from 1 to 4 carbon atoms; where Z is a divalent radical derived from an olefin selected from the class consisting of perfluorochloro and perfluorochloro hydro monoolefins having from 2 to 4 carbon atoms and perfluoro and perfluorohydro monoolefins having from 3 to 4 carbon atoms; where $n$ and $m$ are integers, the value of $n+m$ ranging from 4 to about 40, and the $n:m$ ratio being in the range of from 95:5 to 75:25; and where Q is selected from the class consisting of hydrogen, iodine, fluorine and chlorine.

2. Cotelomers in accordance with claim 1 in which the $n:m$ ratio is in the range of from 90:10 to 80:20.

3. Cotelomers having the formula $$R(CF_2CFCl)_m(CH_2CF_2)_nQ$$

where R is selected from the class consisting of perfluoroalkyl and perfluorochloroalkyl radicals having from 1 to 4 carbon atoms; where $n$ and $m$ are integers, the value of $n+m$ ranging from 4 to about 40, and the $n:m$ ratio being in the range of from 95:5 to 75:25; and where Q is selected from the class consisting of hydrogen, iodine, fluorine and chlorine. 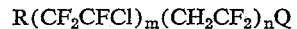

4. Cotelomers of the formula $$R[CF_2CF(CF_3)]_m[CH_2CF_2]_nQ$$

where R is selected from the class consisting of perfluoroalkyl and perfluorochloroalkyl radicals having from 1 to 4 carbon atoms; where $n$ and $m$ are integers, the value of $n+m$ being from 4 to 40; and the $n:m$ ratio being in the range from 95:5 to 75:25; and where Q is selected from the class consisting of hydrogen, iodine, fluorine and chlorine. 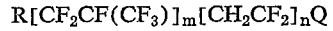

5. Cotelomers of the formula $$R(CF_2CHCl)_m(CH_2CF_2)_nQ$$

where R is selected from the class consisting of perfluoroalkyl and perfluorochloroalkyl radicals having from 1 to 4 carbon atoms; where $n$ and $m$ are integers, the value of $n+m$ being in the range of from 4 to about 40; the $n:m$ ratio being in the range of from 95:5 to 75:25; and where Q is selected from the class consisting of hydrogen, iodine, fluorine and chlorine. 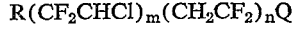

References Cited in the file of this patent

UNITED STATES PATENTS

| | | |
|---|---|---|
| 2,705,706 | Dittman et al. | Apr. 5, 1955 |
| 2,856,440 | Wolff | Oct. 14, 1958 |
| 2,898,382 | Barnhart | Aug. 4, 1959 |